United States Patent [19]

Gaucher et al.

[11] 4,397,099
[45] Aug. 9, 1983

[54] ELECTRONIC APPARATUS FOR MEASURING THE DIFFERENCE OF ELEVATION BETWEEN TWO POINTS

[76] Inventors: Edwin Gaucher, 5 rue Hamel, apt. 203, Quebec, Quebec, Canada, G1R 4J6; Rèjean Desbiens; Régis Desbiens, both of 2200 Chapdelaine apt. 603, Ste-Foy, Quebec, Canada, G1V 4G8

[21] Appl. No.: 300,211
[22] Filed: Sep. 8, 1981
[51] Int. Cl.³ ................................ G01C 5/04
[52] U.S. Cl. ........................................ 33/367
[58] Field of Search ............ 33/366, 367; 73/708, 73/747, 749, 750, 723

[56] References Cited

U.S. PATENT DOCUMENTS 2,592,744  4/1952  Ryant ........................... 73/708 X
4,145,817  3/1979  Ager ............................. 33/367

FOREIGN PATENT DOCUMENTS 2739975  3/1978  Fed. Rep. of Germany ........ 33/367

*Primary Examiner*—Harry N. Haroian
*Attorney, Agent, or Firm*—Robic, Robic & Associates

[57] ABSTRACT

In an electronic apparatus for measuring a difference of elevation between two points, said apparatus comprising: a tube made of a flexible material; a fluid with a low viscosity completely filling said tube; two piezoelectronical pressure transducers each connected to a source of electrical power and mounted at one extremity of the tube in contact with the fluid filling said tube to produce signal a proportional to the pressure of this fluid; electronic means connected to each of said piezoelectrical pressure transducers for processing the signals received from said transducers, said processing means comprising means for generating a signal proportional to the difference between the signals received from the transducers and means for converting said generated signal into a value indicating the difference of elevation between the extremities of the tube, and means for displaying said value indicating the difference of elevation, the improvement wherein it further comprises means for generating a signal proportional to the mean temperature of the fluid filling said tube; and means for correcting said generated signal proportional to the difference between the signals received from the transducers, with said generated signal proportional to the mean temperature in order to compensate any variation of said generated signal due to a variation in the fluid temperature along the tube.

6 Claims, 5 Drawing Figures

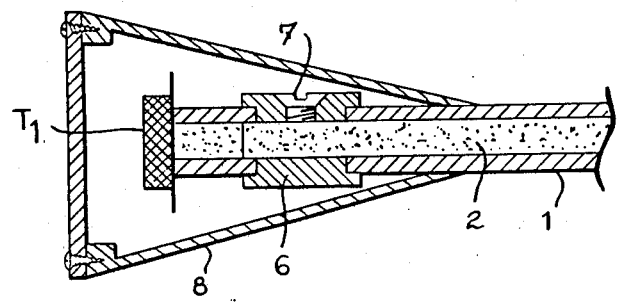
Fig. 2a
Fig. 2b
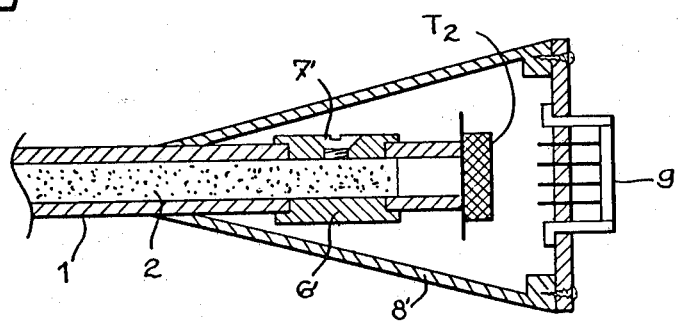

ELECTRONIC APPARATUS FOR MEASURING THE DIFFERENCE OF ELEVATION BETWEEN TWO POINTS

BACKGROUND OF THE INVENTION (a) Field of the Invention

The present invention relates to an electronic apparatus for measuring the difference of elevation between two points at different locations. More particularly, the invention relates to an electronic apparatus for measuring such a difference of elevation in an automatic manner and with a compensation of any variation of temperature, and for immediately displaying the so-measured value.

(b) Description of the Prior Art

A conventional method for measuring the difference of elevation between two points or the height of a point with respect to another, consists in measuring the length and the angle of inclination of a line joining these two points with an optical apparatus such as a stadia or a theolite and thereafter calculating the desired value from the so-measured data.

This conventional method while being technically accurate per se, is however time consuming and requests a specialized staff. Moreover, this conventional method is carried out with substantial difficulties or cannot even be carried out at all when the measurement has to be made in a wooded or broken area where there is no visual contact between the two points between which the difference of elevation has to be measured. To overcome this drawback specific to the conventional method, non-optical apparatuses have been proposed. Examples of such non-optical apparatuses are described in U.S. Pat. No. 2,557,021 to Williams issued on June 12, 1951; U.S. Pat. No. 2,851,799 to Meents et al. issued on Sept. 16, 1958; U.S. Pat. No. 3,494,202 to Komay issued on Feb. 10, 1970; U.S. Pat. No. 3,815,423 to Gearhart issued on June 11, 1974 and U.S. Pat. No. 2,844,037 to Jordan issued on July 22, 1958.

Generally, all these known apparatuses can be used in geodesical survey for determining the vertical distance between two points located at two different levels by measurement of a hydrostatic pressure difference. The measurement of this hydrostatic pressure difference and the reading of this measurement however is made by mechanical means, such as, for example, by movement of a piston or a flexible membrane caused by the hydrostatic pressure. If these known apparatuses have some advantages, they also have substantial drawbacks. In particular, these known apparatuses have a small accuracy and they are restricted in use and application because of their size, when the difference of elevation to be measured is of a substantial value.

U.S. Pat. No. 4,145,817 to Ager issued on Mar. 27, 1979 describes an apparatus comprising a pair of electronic pressure transducers located at the extremities of a tube filled with a fluid. The electronic signals generated by the transducers as a function of the fluid pressures at both extremities of the tube are transmitted to an electronical circuit which evaluates the difference of elevation between the two transducers. This type of apparatus is a little more accurate than the above mentioned known apparatuses. However, the data displayed by this apparatus are also subject to error due to the difference of temperature of the fluid inside tube. Indeed, if one extremity or one part of the tube is exposed to the sun and the other is in the snow, the temperature of the fluid inside the tube varies from one extremity thereof to the other and generates a measuring error of about 0.13% per °C. In some cases, the so generated error can be substantially higher than the maximum allowance that is necessary in some applications. Thus, the apparatus disclosed in this patent cannot really be used in areas where part of the tube passes under the shadow of trees and other parts of the same tube are exposed to the sun.

SUMMARY OF THE INVENTION

The object of the present invention is to provide an apparatus which overcomes the above mentioned drawbacks of all the known apparatuses. More particularly, the object of the present invention is to provide an apparatus which can measure the difference of elevation between two points in a very accurate and fast manner, due to the presence of a circuit for automatically compensating any variation of temperature.

Another object of the present invention is to provide an apparatus for geophysical and gravimetrical surveys and mining exploration, which is easy to handle and to operate, even by a non specialized labour, and which does not make it necessary to have a visual contact between the points between which the difference of elevation has to be measured.

A further object of the invention is to provide an apparatus for measuring a substantial difference of elevation between two points by simple reading of a display.

Basically, the apparatus according to the invention for measuring the difference of elevation between two points comprises:

(a) a tube made of flexible material;

(b) a fluid with a low viscosity completely filling this tube;

(c) two piezoelectronical pressure transducers each connected to a source of electrical power and mounted at one extremity of the tube into contact with the fluid filling this tube to produce a signal proportional to the pressure of this fluid;

(d) electronic means connected to each of the piezoelectronical pressure transducers for processing the signals received from these transducers, these processing means comprising means for generating signals proportional to the difference between the signals received from the transducers and means for converting this generated signal into a value indicating the difference of elevation between the extremities of the tube; and (e) means for displaying this value indicating the difference of elevation.

In accordance with the invention, the above defined apparatus is improved in that it further comprises means for generating a signal proportional to the mean temperature of the fluid in the tube and means for correcting the generated signal proportional to the difference between the signals from the transducers with the signal proportional to the mean temperature of the fluid in order to compensate any variation of this generated signal due to a variation in the fluid temperature along the tube.

BRIEF DESCRIPTION OF THE DRAWINGS

The present invention will be better understood from the following, non-restrictive description of two preferred embodiments thereof with reference to the accompanying drawings wherein:

FIGS. 2a and 2b are cross-sectional views of the pressure transducers located at both extremities of the tube of the apparatus shown on FIG. 1;

DESCRIPTION OF PREFERRED EMBODIMENTS OF THE INVENTION

Figure 1:
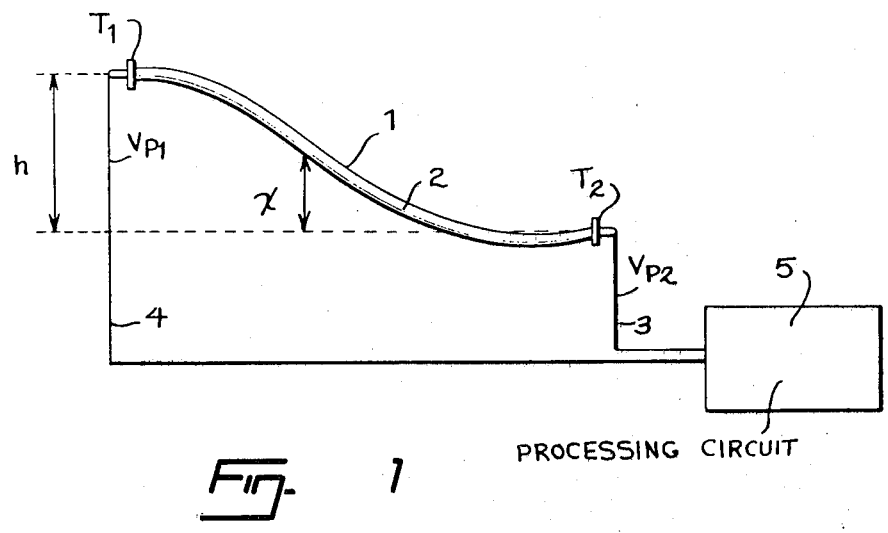
FIG. 1 is a schematic illustration of an electronic measuring apparatus according to the invention.

The electronic apparatus illustrated on FIG. 1 is designed for measuring the difference of elevation between two points where are located two transducers T1 and T2. This apparatus comprises a long tube 1 made of a flexible material, such as rubber or plastic, which is completely filled with a fluid 2 having a low viscosity and a low dilatation coefficient. An example of such a fluid is silicon oil. As aforesaid, the pressure transducers T1 and T2 are mounted to both extremeties of the tube 1, respectively. These transducers are in contact with the fluid 2 and transform the pressure of this fluid in contact thereto into an electrical voltage. This is already known in the art and will not be described hereinafter. The piezoelectric transducers T1 and T2 are respectively connected by means of conductors 3 and 4 to a processing and displaying device 5 in which the voltage VT1 and VT2 respectively supplied by the transducers are computed to determine the difference of fluid pressure at the extremities of the tube 1. This difference of pressure actually is directly proportional to the elevation h between the points where are located the transducers T1 and T2. Indeed, if the pressure P1 and P2 at both extremities of the tube are expressed in function of an arbitrary pressure $P_x$ corresponding to a given height x of the tube, the following equations are obtained:

$$P_1 = P_x - sg(h-x)$$

$$P_2 = P_x + sgx$$

wherein s is the density of the fluid and g the gravitational acceleration constant.

By substracting the above equations, we get:

$$P_2 - P_1 = sgh$$

that is:

$$h = (P_2 - P_1)/sg$$

Thus, it can be seen that the difference of elevation h as measured by the apparatus is directly and only proportional to the pressure $P_1$ and $P_2$ of the fluid, as detected at the extremities of the tube, and is completely independent of the length of this tube. However, even if the above equation is exact, there is still an error due to the temperature variation. Indeed, even a slight variation of temperature affects the values of the density of the fluid and the internal pressure inside the tube. If there is only a small variation of temperature along the tube, the measurement error due to this variation of temperature is very small and does not affect in a substantial manner the accuracy of the reading. However, if the tube is located in an area subjected to temperature conditions varying along its length, this variation of temperature must be compensated to obtain an accurate reading.

The device 5 to which the tube is connected comprises a circuit for processing the signal received from the piezoelectric transducers T1 and T2 to give a value of the difference of elevation. The device 5 also comprises a circuit for compensating the variation of temperature to overcome the above mentioned drawback.

FIGS. 2a and 2b are cross-sectional views of the transducers T1 and T2, respectively, when fixed to the corresponding extremities of the tube 1. Each transducers T1 and T2 is in direct contact with the fluid 2 inside the tube and is fixed to this tube by means of a connector 6 or 6' provided with a screw 7 or 7' to allow the air bubbles that may be found in the fluid 2, to escape when fixing the transducers. The transducers T1 and T2 are mounted into boxes 8 and 8' that can be conical as shown in the drawings and are made of a rigid material to shield the transducers and protect them from external shocks. The transducer assembly shown on FIG. 2b also comprises a connecting socket 9. This socket 9 permits to attach the tube 2 to the device 5 illustrated on FIG. 1, while simutaneously connecting a power source to the transducers T1 and T2 and connecting these transducers to the circuits of the device 5. The socket 9 also connects a resistive wire located inside the tube to the temperature compensating circuit located inside the device 5.

The various wires (not shown) connecting the transducer T1 to the device 5 are located inside the tube 1 to facilitate handling of the apparatus and to avoid possible harm. The above mentioned resistive wire used from the temperature compensation is also located inside the tube and runs back and forth from one extremity to the other. Of course, the resistivity of this wire varies as a function of the temperature of the fluid inside tube and permits to give a reference value used for compensating any temperature variation.

Of course, the invention is no way restricted to the very specific shape of the boxes 8 and 8' as previously described nor to the very specific transducer assembly illustrated on FIGS. 2b and 2a, provided that fitting of the piezoelectrical transducers to the flexible tube 1 is really tight to avoid loss of fluid 2 and the fluid is in direct contact with the transducers. In order to make the apparatus as accurate as possible, use must preferably be made of transducer T1 and T2 having similar operating characteristics. By way of example, use can be made of two transducers of the type LX16 XXA manufactured by the National semi Conductor Corporation. These transducers operate normally under pressures varying from 10 to 100 pounds per square inches and under DC voltage of 15 volts.

The device 5 shown of FIG. 1 advantageously comprises a box in which is located a set of batteries to provide power to the transducers in addition to the processing and compensation circuit. The device also comprises a digital display to display the measured elevation. Such a box may be of 4"×4"×8" and may weight about 5 pounds in order to be easy to carry and to put away. These dimensions are in no way limitative and are just given for illustrative purpose.

Figure 3:
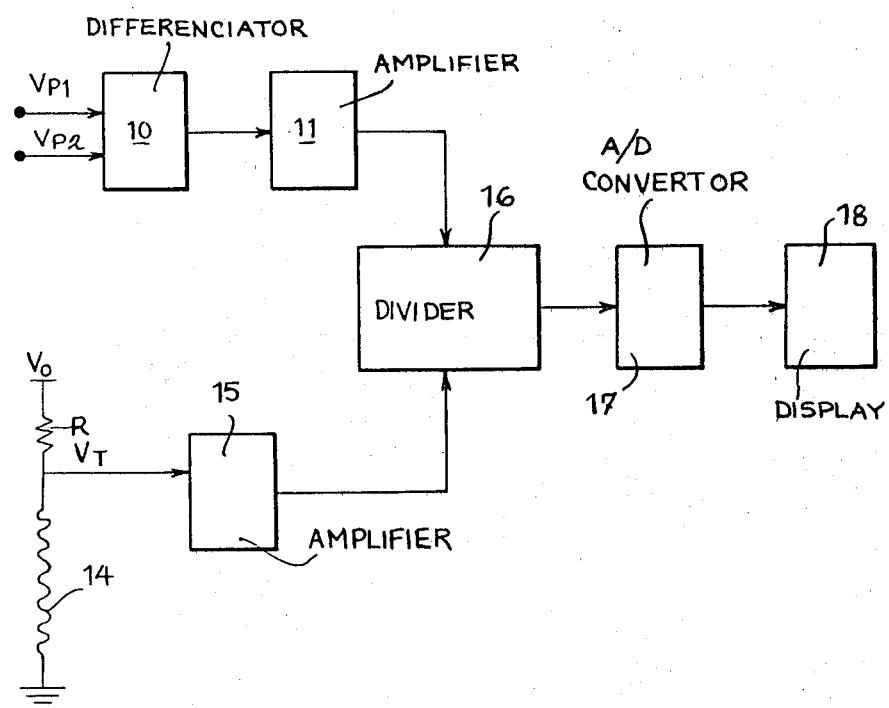
FIG. 3 is a schematic diagram of an analog circuit for processing the signals received from the piezoelectric transducers and for displaying a corresponding value indicating the difference of elevation with a compensation of temperature.

FIG. 3 is a schematic diagram of the electronic circuit of the device 5 shown on FIG. 1. This electronical circuit comprises a differentiator 10 which receives the voltages VP1 and VP2 generated respectively by the transducers T1 and T2 at the extremities of the tube 1. This differentiator substracts these voltages to give an analog signal proportional to the amplitude of, and of the same sign as, the difference of elevation between the transducers T1 and T2. This analog signal is then amplified by an amplifier 11 which is adjusted as a function of the density of the fluid filling the tube 1. This adjustment is made in a known manner by simply varying the value of a resistor located in feedback to the amplifier circuit. The amplified signal then passes through a divider 16 in which its value is compensated in function of the variation of the temperature as will be explained hereinafter. Finally, the divided signal reaches an analog-digital converter 17 having an output connected to a display 18 comprising a plurality of light emitting diodes forming a numerical display for digitally showing the algebrical value of the difference of elevation and simultaneously giving the sign of this difference of elevation according as the transducer T1 is located over or below the transducer T2. As electronic circuit for converting the voltage signal into an electrical code for display, use can be made of integrated circuits such as those sold by the firm Silicon Inc. of California, which are very compact.

As aforesaid, it is compulsory to take into account the variation of temperature along the tube for obtaining an exact value of the difference of elevation. Indeed, as can be easily understood, any variation of temperature along the tube will produce a proportional contraction or dilatation of the fluid 2 contained in the tube 1, which in turn will operate a variation of pressure that must be compensated. In accordance with the invention, use is therefore made of an additional circuit for automatically compensating any variation of temperature in order to obtain a final reading which corresponds to the actual value of the difference of elevation to be measured, independently of any variation of temperature.

For this purpose, an electrical wire 14 having a low electrical resistivity of about 6 to 12 ohms is inserted into the tube 1 in contact with the fluid 2. As aforesaid, this wire 14 goes forth and back in the tube 1. As the resistivity of this wire varies in function of its temperature, any variation of the mean temperature of the fluid 2 will result in a variation of the resistivity of the wire which in turn, will result in a proportional variation of a voltage measured at the terminals of the wire. To measure this voltage, the terminals of the wire 14 are connected to a DC reference voltage $V_O$ by means of a resistor R. The voltage VT which is measured is amplified by an amplifier 15 to give a compensation signal that is supplied to the divider 16 in which the differenciated signal is divided by the compensation signal. This divided signal which takes into account any variation of temperature is then supplied to the analogical-digital converter 17 and then to the display 18 as indicated hereinabove.

The above described temperature compensating circuit advantageously permits to obtain accurate results whatever is the variation of the temperature. Indeed, any variation of temperature will cause similar variation in the signals VP and VT and of course, the ratio of VP to VT given by the divider 16 will remain constant independently of the amplitude of the temperature variation for a given difference of elevation.

It should be noted that calibration of the above circuit can be made by adjustment of the gain of either amplifier 11 or 15.

It should also be noted that the circuit illustrated in FIG. 3 is supplied by a DC power source (not shown). This DC power source can consist in a plurality of rechargeable batteries. If necessary, a DC-DC converter can be used for providing the requested stable voltage to the electronical circuit.

The electronic apparatus described hereinabove permits to measure differences of elevation having up to 100 feet (30 m.) with an accuracy of ±0.1 feet (3 cm) under temperature conditions varying from 0° F. to 120° F. (−20° C. to 45° C.). This accuracy represents in extreme conditions, a reading error of less than 1% when the calibration of the electronical apparatus is made at an altitude of ±20 feet (7 m) and under normal temperature. Thus, the readings of the electronical apparatus according to the invention are much more accurate than the readings of most of the known measuring apparatuses.

Figure 4:
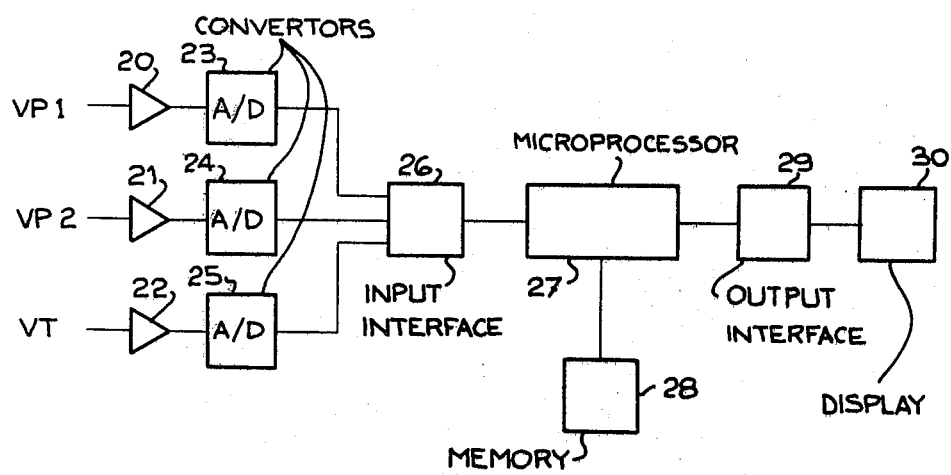
FIG. 4 is a schematic diagram of a micro processor-based circuit for processing the signals received from the piezoelectric transducers and displaying a corresponding value indicating the difference of elevation with the compensation of temperature.

FIG. 4 is a diagram of another embodiment of electronic circuit for use in a measuring apparatus according to the invention. In this other circuit, the voltage signal VT1 and VT2 proportional to the pressure measured by both transducers and the voltage signal VT proportional to the temperature are amplified by amplifiers 20, 21 and 22 and then converted into digital signals by three analog-digital converters 23, 24 and 25, respectively. The obtained digital signals are then sensed by a microprocessor 27 at an input interface 26. The microprocessor 27 advantageously comprises an interpolation table located in a memory 28 and computes the digital signals sensed at the input interface 27 to give a computed value representative of the difference of pressure at the extremities of the tube independently of the temperature of the fluid. It should be noted that this computation permits to use two different types of pressure transducers. The computer also linearizes the signals from the transducers in function the actual pressure and temperature. In this regard, it must be noted that such a "correction" of the linearity of the signals received from the transducers improves the accuracy of the apparatus, such being particularly important when a high accuracy survey is requested.

The memory containing the interpolation table can advantageously be in the form of a chip which is fixed onto the tube 1 or at one extremity thereof. This arrangement is particularly interesting since the memory which contains the interpolation table of a specific tube and transducers assembly may also be contain other information specific to the said tube and transducers assembly, such as the density of fluid and/or the linearity corrections for each transducer. The memory will then remain permanently fixed onto the tube and transducers and will make it interchangeable from one processing device 5 to another.

In operation, the micro processor senses the digital values representative of the pressures at both extremities of the tube and of the mean temperature at the output of the convertors. The micro processor then computes these digital values together to give a computed value representating the difference of pressures at the extremities of the tube independently of the temperature of the fluid. Then the micro processor compares to the so computed value to the data of the interpolation table stocked in the memory and interpolates from said data the actual value of the difference of elevation between both extremities of the tube as measured by the apparatus. Last of all, the micro processor transmits the actual value of the difference of elevation to a display 30 via an output interface 29.

As can be easily understood, the factor of conversion of units, the gravitational acceleration constant and the density fluid may also be stocked into the memory so that the processor may compute almost directly the difference of elevation while compensating the temperature.

Of course, the present invention is by no way restricted to the very specific embodiments described hereinabove. Indeed, it is obvious that the numerical display mentioned hereinabove can be replaced by an analog reading display or by a recording circuit using either a band of paper or a tape.

What is claimed is:

1. An electronic apparatus for measuring a difference of elevation between two points, said apparatus comprising:
   (a) a tube made of a flexible material;
   (b) a fluid with a low viscosity completely filling said tube;
   (c) two piezoelectronical pressure transducers each connected to a source of electrical power and mounted at one extremity of the tube in contact with the fluid filling said tube to produce a signal proportional to the pressure of this fluid;
   (d) electronic means connected to each of said piezoelectrical pressure transducers for processing the signals received from said transducers, said processing means comprising means for generating a signal proportional to the difference between the signals received from the transducers and means for converting said generated signal into a value indicating the difference of elevation between the extremities of the tube,
   (e) means for displaying said value indicating the difference of elevation,
   (f) means for generating a signal proportional to the mean temperature of the fluid filling said tube; and
   (g) means for correcting said generated signal proportional to the difference between the signals received from the transducers, with said generated signal proportional to the mean temperature in order to compensate any variation of said generated signal due to a variation in the fluid temperature along the tube, wherein:
   said correcting means comprises means for dividing the signal proportional to the difference of values between the signal received from the transducers by the signal proportional to the mean temperature to give a corrected output signal and
   said converting means comprises an analog digital converter receiving the output signal of the dividing means and transmitting a corresponding value indicating the difference of elevation to the displaying means.

2. An electronic apparatus as claimed in claim 1, wherein said processing means are constituted by a micro processor connected to at least one analog-digital converter for converting the signals received from said transducers and the signal proportional to the mean temperature of the fluid into digital values that can be processed by said micro processor, said micro processor sensing said digital values representative of the pressures at both ends of the tuve and of the mean temperature, said microprocessor further computing said digital values altogether to give a computed value representative of the difference of pressures at the extremities of the tube independently of the temperature of the fluid, then comparing the so computed value to a plurality of values corresponding to a plurality of differences of elevation, and finally interpolating from said plurality of values the actual value of the difference of elevation between both extremities of the tube as measured by the apparatus.

3. An electronic apparatus as claimed in claim 2, wherein the plurality of values used for interpoling the actual value of difference of elevation as measured by the apparatus are stocked into a memory which is fixed onto the tube to make it interchangeable.

4. An electronic apparatus for measuring a difference of elevation between two points, said apparatus comprising:
   (a) a tube made of a flexible material;
   (b) a fluid with a low viscosity completely filling said tube;
   (c) two piezoelectronical pressure transducers each connected to a source of electrical power and mounted at one extremity of the tube in contact with the fluid filling said tube to produce a signal proportional to the pressure of this fluid;
   (d) electronic means connected to each of said piezoelectrical pressure transducers for processing the signals received from said transducers, said processing means comprising means for generating a signal proportional to the difference between the signals received from the transducers and means for converting said generated signal into a value indicating the difference of elevation between the extremities of the tube,
   (e) means for displaying said value indicating the difference of elevation,
   (f) means for generating a signal proportional to the mean temperature of the fluid filling said tube; and
   (g) means for correcting said generated signal proportional to the difference between the signals received from the transducers, with said generated signal proportional to the mean temperature in order to compensate any variation of said generated signal due to a variation in the fluid temperature along the tube, wherein the means for generating a signal proportional to the mean temperature of the fluid comprises an element extending along the tube in the fluid and having a low electrical resistivity, and a voltage reference generator for supplying said element with a stable, D.C. voltage.

5. An electronic apparatus as claimed in claim 4, wherein said processing means are constituted by a micro processor connected to at least one analog digital converter for converting the signals received from said transducers and the signal proportional to the mean temperature of the fluid into digital values that can be processed by said micro processor, said micro processor sensing said digital values representative of the pressures at both ends of the tube and of the mean temperature, said microprocessor further computing said digital values altogether to give a computed value representative of the difference of pressures at the extremities of the tube independently of the temperature of the fluid, then comparing the so computed value to a plurality of values corresponding to a plurality of differences of elevation, and finally interpolating from said plurality of values the actual value of the difference of elevation between both extremities of the tube as measured by the apparatus.

6. An electronic apparatus as claimed in claim 5, wherein the plurality of values used for interpoling the actual value of difference of elevation as measured by the apparatus are stocked into a memory which is fixed onto the tube to make it interchangeable.

* * * * *

UNITED STATES PATENT AND TRADEMARK OFFICE
CERTIFICATE OF CORRECTION

PATENT NO. : 4,397,099
DATED : August 9, 1983
INVENTOR(S) : Edwin GAUCHER, Réjean DESBIENS and Régis DESBIENS It is certified that error appears in the above-identified patent and that said Letters Patent is hereby corrected as shown below:

Column 3, line 34, reference numerals «$VT_1$ and $VT_2$» should read: --$VP_1$ and $VP_2$--;

Column 6, line 15: «1%» should read --0.1%--;

line 17: «altitude» should read --difference of elevation--;

line 25: reference numerals «$VT_1$ and $VT_2$» should read --$VP_1$ and $VP_2$--;

line 34: reference numeral «27» should read: --26--;

Column 7, line 68: «tuve» should read: --tube--.

Signed and Sealed this

Twenty-second Day of May 1984

[SEAL]

Attest:

GERALD J. MOSSINGHOFF

Attesting Officer

Commissioner of Patents and Trademarks